(12) United States Patent
Balt

(10) Patent No.: US 7,091,628 B1
(45) Date of Patent: Aug. 15, 2006

(54) SYSTEM FOR HARVESTING ROTATIONAL ENERGY FROM FLUID FLOW IN A PRESSURIZED SYSTEM

(76) Inventor: Roger Seth Balt, P.O. Box 330 443, San Francisco, CA (US) 94133

( * ) Notice: Subject to any disclaimer, the term of this patent is extended or adjusted under 35 U.S.C. 154(b) by 285 days.

(21) Appl. No.: 10/846,892

(22) Filed: May 17, 2004

(51) Int. Cl.
*F03B 17/00* (2006.01)

(52) U.S. Cl. .......................................... 290/54; 290/43

(58) Field of Classification Search ................. 290/54, 290/43
See application file for complete search history.

(56) References Cited

U.S. PATENT DOCUMENTS

| | | | | |
|---|---|---|---|---|
| 2,436,683 A | * | 2/1948 | Wood, Jr. .................... | 290/52 |
| 3,867,655 A | * | 2/1975 | Stengel et al. ................ | 310/66 |
| 5,043,592 A | * | 8/1991 | Hochstrasser ................ | 290/52 |
| 5,433,118 A | * | 7/1995 | Castillo .................... | 73/861.77 |
| 6,212,959 B1 | * | 4/2001 | Perkins .................... | 73/861.77 |
| 6,526,907 B1 | * | 3/2003 | Donehue .................... | 116/274 |
| 6,681,645 B1 | * | 1/2004 | Feller ....................... | 73/861.71 |
| 6,848,503 B1 | * | 2/2005 | Schultz et al. ............. | 166/66.5 |

FOREIGN PATENT DOCUMENTS

| | | | |
|---|---|---|---|
| EP | 176149 A2 | * | 4/1986 |
| JP | 63308300 A | * | 12/1988 |
| KR | 2004101105 A | * | 12/2004 |

* cited by examiner

*Primary Examiner*—Joseph Waks

(57) ABSTRACT

A predetermined portion of the energy available in a flowing fluid within a pipe is converted to torque in a rotating system outside the pipe. The rotational energy thus obtained is available to other uses at the end-user's discretion. A preferred embodiment comprises a magnetic turbine with blades (705), and includes an external rotating ring (720) with attached pole pieces (710–715) comprising either permanent magnets, or electromagnets with coils (745–750) which are connected through slip rings (not shown) to an external power source (not shown) and thereby energized. Attraction between the pole pieces and the rotating turbine causes the external ring to rotate. A mechanical coupling (730) couples the ring to a generator (732) or other load such as a grinding wheel (not shown) through a shaft (725).

16 Claims, 2 Drawing Sheets

Figure 3:
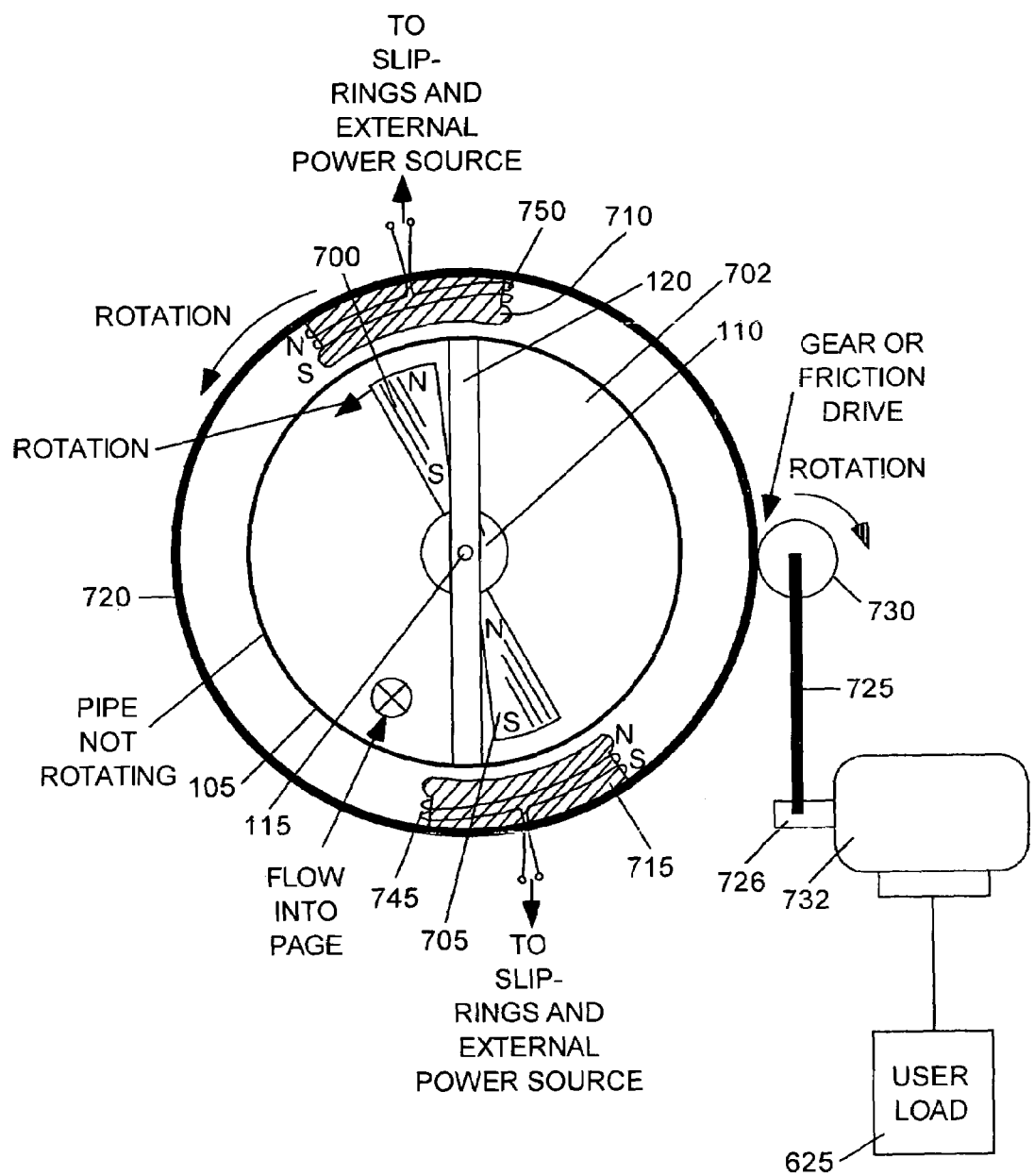

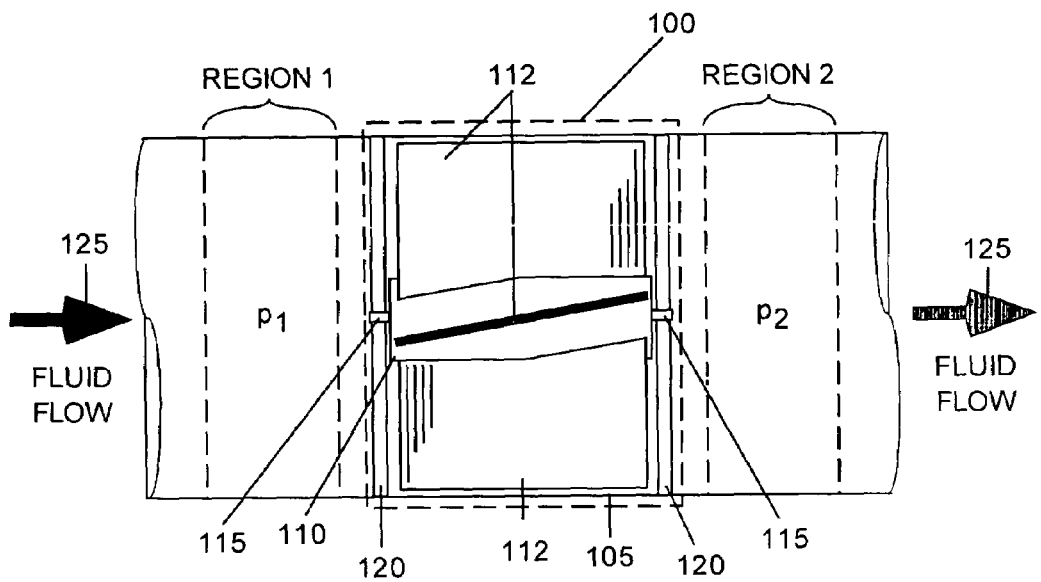
Fig. 1--Prior Art
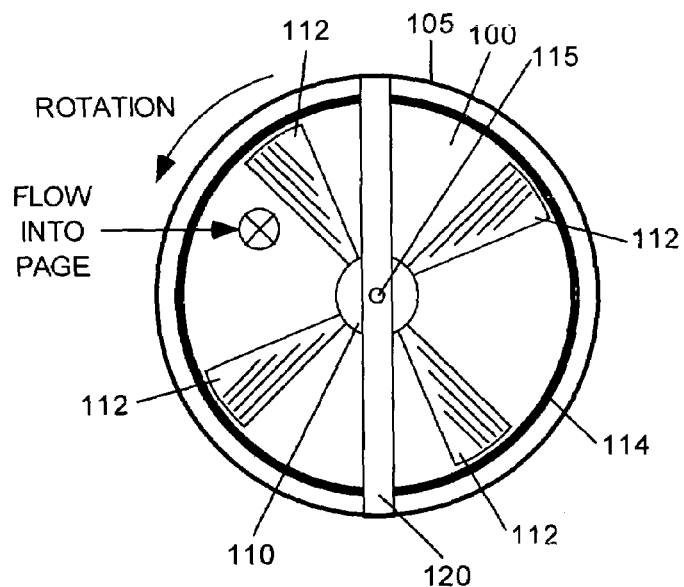
Fig. 2--Prior Art

SYSTEM FOR HARVESTING ROTATIONAL ENERGY FROM FLUID FLOW IN A PRESSURIZED SYSTEM

FEDERALLY SPONSORED RESEARCH

None

SEQUENCE LISTING

None

BACKGROUND

1. Field of Invention

This invention relates generally to the hydraulic generation of rotational energy, particularly to the transmission of torque from fluid flow using a magnetic coupling to generate power.

2. Prior-Art

Flow Meters

Many types of machines for converting mechanical or hydraulic power to electric power are known. In U.S. Pat. No. 6,212,959 (2001) Perkins teaches a flow meter which comprises a turbine within a pipe and coils exterior to the pipe. The axis of the turbine is parallel to the axis of the pipe. At least one permanent magnet is affixed to the turbine. As water flows through the pipe, the turbine turns. As the turbine turns, the magnetic field lines from the moving permanent magnet(s) pass through the pipe wall, intersect a coil outside the pipe, and generate a current within the coil. This current passes through a load resistance and generates a voltage which is proportional to the rate of rotation of the turbine, which in turn is proportional to the flow of water through the pipe. This voltage is measured by a microprocessor circuit and converted to a reading indicative of the flow rate.

While this arrangement accurately measures flow, it is not designed to provide significant power output, e.g., as can be utilized by electric machinery, appliances, or light sources.

Hydroelectric Generators

Another well-known type of converter is the hydroelectric generator. They are seen on dams, for example. Water is stored on the upstream side of the dam at a considerable depth—200 meters is not uncommon. The water head at the base of the dam is equal to 4 the depth of the water stored. The pressure due to the head (difference in height from the surface of the water to the turbine) represents a significant potential energy stored in the water.

A turbine is located at the base of the dam on the downstream side. Water flows from the upstream side through large pipes called penstocks, through the turbine, and out on the downstream side, usually to a river or stream. As the water flows through the turbine, its head is converted to rotational kinetic energy. The shaft of the turbine turns an electrical generator in well-known fashion, thus converting the rotational kinetic energy to electric power.

The turbine and the generator are separate machines that are connected by a common shaft. The shaft passes from the fluid-filled region containing the turbine blades, through a water seal and out into the dry region containing the generator.

In the interest of efficiency, it is normal practice for the turbine to extract the maximum possible amount of energy from the flowing water. Thus the water head at the output of the turbine is at a minimum value. Varying the output of the generator is accomplished by adjusting the flow of water through the turbine. While this system generates a large amount of electricity, little water pressure is available for other uses after passage through the turbine. And while the electricity generated is available to an end user, the end user is unable to adjust the flow of water through the turbine in proportion to their needs. In addition, these generating systems are typically very large and immobile.

Magnetic Stirrers

Still another type of converter is found in chemistry, where some processes require controlled agitation within a sealed vessel. The ability of magnetism to penetrate the vessel has been used to impart rotation to a magnetic stirrer. This process involves the expenditure of energy for the purpose of doing work within the sealed environment, and is not intended to harvest energy for storage or transformation as an addition to the function of a fluid delivery system.

FIGS. 1 and 2—Turbine—Description

FIGS. 1 and 2 show a cross-sectional side view and an axial view, respectively, of a turbine 100 contained within a pipe 105. Turbine 100 is mounted on a shaft 110 which terminates in bearings 115. Four blades 112 are joined to shaft 110 at an acute angle with respect to the axis of shaft 110. All four blades are shown in full view in FIG. 2, while only three can be seen in FIG. 1 (one edge-on and two in full view). Fluid passing through turbine 100 impinges on blades 112, causing them to rotate. In this example, when a fluid flows in the direction of arrows 125, the blades rotate clockwise. Typically, although four blades are shown in FIGS. 1 and 2, there can be any number of blades depending upon the size and design of the turbine and pipe assembly, such as between two and several hundred blades. Turbine 100 can be made of steel, plastic, or another suitable material. The assembly comprising turbine 100, shaft 110, and bearings 115 is supported by struts 120 affixed to the interior of pipe 105. The outer diameter of turbine 100 is preferably equal to at least ninety-five percent of the inside diameter of pipe 105. This ensures that fluid flow, indicated by arrows 125, impinges primarily on angled blades 112, causing turbine 100 it to rotate. When a fluid, such as water, flows through pipe 105, turbine 100 turns at a rate proportional to the flow.

Operation

If turbine 100 is allowed to turn freely, pressure $p_1$ in a flow Region 1 before turbine 100 is nominally equal to pressure p2 in a flow Region 2 after turbine 100. If, through some action as explained below, rotation of turbine 100 is impeded, then $p_1$ will be greater than $p_2$.

In FIG. 1, the same volume of fluid is contained within Regions 1 and 2. In this example, pipe 105 is of constant diameter, and the fluid indicated by flow arrows 125 is incompressible. In this case, the energy equation, well known to those skilled in the art of hydrodynamics, reduces to:

$$H = \left(\frac{p}{\rho g} + \frac{V^2}{2g} + z\right)_2 - \left(\frac{p}{\rho g} + \frac{V^2}{2g} + z\right)_1,$$

where H is the head or pressure difference between input and output of the turbine, subscript 1 indicates those parameters in Region 1 before turbine 100, subscript 2 indicates those parameters in Region 2 after turbine 100, p is the pressure at each region, ρ is the density of the fluid (water in this example) g is the acceleration due to gravity, V is the average velocity of the fluid in each region, and z is the height in each region. Other factors which influence head, such as friction, temperature differences, and the like are ignored in the present discussion. The above equation indicates that the head is generally proportional to the difference in height, pressure, and velocity between Regions 1 and 2.

EXAMPLE

Pressure Difference

In an example assume that water is flowing through pipe 105 from a source of higher pressure to a sink at a lower pressure. Let $p_2=0.8$ $p_1=3.3\times10^5$ n/m$^2$, $z_2=z_1$, and the pipe diameter in regions 1 and 2 be equal. Then H=8.2 m. If the volumetric flow rate $Q=1.1\times10^{-3}$ m$^3$/sec, then the resulting turbine power is equal to:

$$P=\rho gHQ=1000\times9.8\times8.2\times1.1\times10^{-3}=88 \text{ Watts.}$$

Means for extracting and utilizing this power in the form of electricity or torque are discussed below.

The above example is illustrative only. Head can be derived from differentials in elevation, velocity, or pressure, or a combination of these variables.

The turbine system of FIGS. 1 and 2 is standard and can generate electricity by mechanically coupling turbine shaft 110 to a generator (not shown). However the mechanical coupling must be done via a fluid seal, which is expensive, difficult to make, and space-consuming. The electric energy generated can be re-converted to torque by an electric motor if desired, but the end user is unable to adjust the flow of water through the turbine in proportion to their needs. Also these generating systems are typically very large and immobile. This system is designed to deliver electricity to large numbers of users, but does not permit the extraction of a variable amount of the energy available from the flowing water, while also individually tailoring their usage of the water as it leaves the turbine. Moreover, the siting requirements of hydroelectric installations, which virtually guarantee that the power produced will be consumed at remote points, with resultant diminution of deliverable power through "line losses", typically in the range of ten percent.

OBJECTS AND ADVANTAGES

Accordingly, one object and advantage of the present invention is to provide an improved method and apparatus for extracting energy available from a fluid flowing in a pipe. Another object is to provide a coupling from turbine to generator which does not require a rotary fluid seal. Other objects and advantages are to provide a means for extracting a predetermined amount of rotational energy from the flow of a fluid within a pipe, to permit the end user to adjust the amount of water head used according to their needs, and to provide a system for extracting only a portion of the head for conversion to torque.

Another object is to capitalize on the ability of a magnetic field to penetrate a system which is sealed and under pressure, thus allowing the harvesting of a varying amount of the energy of the pressure head contained therein, while leaving the remaining pressure to energize the delivery of the fluid contained in the system.

Additional objects and advantages will become apparent from a consideration of the drawings and ensuing description.

SUMMARY

In accordance with the present invention, a method and apparatus are provided which permit an end user or an intermediate transmitter to drain a variable amount of energy from a fluid flowing in a pipe. A magnetic turbine rotates within a pipe. Its rotational energy is magnetically coupled to a rotating assembly outside the pipe without the use of a rotary seal. A gear or friction wheel connects the exterior rotating assembly to a user load, such as an electrical generator, grinding wheel, and the like. The apparatus is arranged to divert a variable and adjustable amount of energy from the flow of fluid in the channel to an external load. The remaining energy in the flowing fluid is available for 4 another use.

DRAWINGS—FIGURES

FIG. 1 is a cross-sectional, side view of a prior-art turbine.
FIG. 2 is an axial view of the prior-art turbine of FIG. 1.
FIG. 3 is an axial view of a fluid flow energy harvesting station according to the present invention.

DRAWINGS—REFERENCE NUMERALS

100 Turbine
105 Pipe
110 Shaft
112 Blade
115 Bearing
120 Strut
125 Fluid Flow Arrow
700 Vane
702 Turbine
705 Vane
710 Pole
715 Pole
720 Ring
725 Shaft
726 Shaft
730 Friction or Gear Drive
732 Generator
750 Winding

DETAILED DESCRIPTION—FIG. 3

FIG. 3 shows an axial view of a two-blade turbine for simplicity. However more blades can be used. Struts 120, pipe 105, and bearings 115 are preferably made of a non-magnetic and non-conductive material, as above. Shaft 110 is preferably made of a magnetic material with high permeability. Vanes 700 and 705 are optionally either permanent magnets with polarities as shown, or they can be simply a magnetic material of high permeability so that poles will be induced in them, as shown, when they are in the vicinity of external pole pieces 710 and 715.

External pole pieces 710 and 715 are attached to the inside of a concentric surrounding rigid cylinder or ring 720. The pole pieces and ring are also made of a magnetic material with high permeability. Thus a closed magnetic circuit is formed through ring 720 when pole pieces 710 and 715 are magnetized by the passage of current through windings 745 and 750 and aligned with vanes 700 and 705. Cylinder or ring 720 has an axial length approximately equal to the axial length of vanes 700. Cylinder or ring 720 is supported outside pipe 105 by bearings (not shown) which permit ring-and-pole assembly 710–720 to rotate outside pipe 105.

A gear or friction drive 730 is rotationally coupled to cylinder 720. Gear 730 has a shaft 725 which rotates with gear 730 and hence with ring or cylinder 720.

The torque thus available from shaft 725 can be coupled to any user load, such as an electrical generator 732. In this case, shaft 725 is coupled to a shaft 726 of generator 732. The electrical output of generator 732 is connected to a user load 625.

Pole pieces 710 and 715 preferably are permanent magnets, but they can also be electromagnets. If they are electromagnets, they are preferably soft iron cores wound with insulated copper wire of appropriate diameter. If 710 and 715 are soft iron cores, windings 745 and 750 are wound around such cores and are energized from a direct-current, external power source (not shown) through conventional slip-rings (not shown).

Operation—Preferred Embodiment—FIG. 3

Fluid flowing past turbine assembly 702 impinges on vanes 700 and 705 and causes turbine assembly 702 comprising blades 700 and 705, and shaft 110 to rotate. Assuming pole pieces 710 and 715 are permanent magnets, they will be attracted to vanes 700 and 705. As vanes 700 and 705 rotate, they will cause pole pieces 710 and 715 to follow, in turn causing external ring 720 to rotate. As ring 720 rotates, gear or friction drive 730 couples this rotation via shaft 725 to generator 732. Generator 732 generates electricity which is delivered to load 625 where it is used immediately or fed back into the existing power grid through an inverter, resulting in a net credit against the power sold to the end user by electric power suppliers.

First Method for Extracting Adjustable Torque

If pole pieces 710 and 715 are electromagnets, a current of predetermined magnitude passes through windings 745 and 750, energizing them. The result is the same as above, except in this case the current through electromagnets with poles 710 and 715 can be varied, providing a variable magnetic coupling between turbine assembly 702 and external ring 720.

If windings 745 and 750 are energized with a sufficiently high current, pole pieces 710 and 715 will couple strongly to blades 700 and 705 and there will be no slippage or differential rotation between turbine assembly 702 and external ring 720. If windings 745 and 750 are energized with a sufficiently low current, pole pieces 710 and 715 will not couple strongly to blades 700 and 705 and there will be slippage between turbine assembly 702 and external ring 720. In this case, it is desirable to have more than two pole pieces 710 and 715 and respective blades 700 and 705 since rough 4 operation can occur as blade 700 approaches pole piece 710 and is attracted to it by magnetic force, then moves past it, beyond the point of magnetic attraction and is released. In this case, it is beneficial to provide additional blades identical in construction to blades 700, 705 and additional pole pieces identical in construction to pole pieces 710 and 715. With the addition of more blades and pole pieces, the frequency of attraction and release increases and its amplitude decreases as regions of attraction and release overlap.

Alternative Method for Extracting Adjustable Torque

Current through windings 745 and 750 on pole pieces 710 and 715 is maintained at a level which prevents slippage between turbine assembly 702 and ring 720. User load 625 is adjusted so that generator 732 presents the desired amount of resistive torque to ring 720 via shafts 725 and 726 and wheel 730.

Thus withdrawal of energy appears as resistance to the flow of fluid 125. The amount of energy extracted is determined in part by the strength of the magnetic coupling between turbine assembly 702 and external ring 720 and the magnitude of torque required is reflected through generator 732 by adjustable user load 625.

If the maximum energy is drawn by load 625, the pressure at the downstream side of the turbine will be very low, but if less than all the energy is drawn by load 625, the pressure at the downstream side of the turbine will be higher and can be used. For example, flowing water can be delivered to an irrigation system. A ten-percent drop in pressure can be tolerated in delivery of the water for its end use. Meanwhile, the ten percent pressure drop (less minor losses) is converted to torque which can power any user load, such as a generator, grinding wheel, and the like. The amount of power taken from the head can increase until the pressure drop becomes greater than can be tolerated. In a practical system, the requirement to maintain pressure head and the power withdrawn are balanced.

Varying rates of flow can be tolerated in a system which includes a water reservoir at a height of 200 feet above a field to be irrigated. During the day when the field must be irrigated, water flow must be at a maximum. At this time, very little energy can be withdrawn from the head and converted to electricity. At night when irrigating is less important, a lower water flow rate can be tolerated and more energy can be withdrawn for use by electrical appliances.

CONCLUSION, RAMIFICATIONS, AND SCOPE

It is thus seen that the present system provides a novel method and apparatus for extracting a variable amount of energy from a stream of flowing fluid. Energy is extracted and used for another purpose without severely impacting the use to which the flowing fluid is applied.

Because the strength of the magnetic field, and the resultant impact upon the flow rate of the flowing fluid is infinitely variable, the device may be placed at any point in a fluid delivery system. Varying demands "downstream" may be accommodated merely by decreasing or increasing the magnetic coupling between the turbine and the external pole assembly, thus allowing for surges in downstream demand to be met, while permitting the harvesting of a larger amount of the energy in the pressure head when the demands of the delivery system permit. The energy thus saved, i.e. not extracted from the fluid flow, can be used for another purpose such as providing a driving force to another mechanism, pumping the fluid to another level, and the like.

While the above description contains many specificities, these should not be considered limiting but merely exemplary. Many variations and ramifications are possible. For example, the torque extraction system can comprise either a small, portable unit with limited torque, or a very large system which provides a great deal of torque. Instead of being driven by water, the turbine can be driven by any fluid flow such as oil, mercury, or a gas.

The turbine blades can be curved and a multi-stage turbine can be used for greater efficiency.

A conventional drag cup design, similar to that used in speedometers, can be used in lieu of an all-magnetic system. In such a design, magnetic turbine blades induce rotation in an external metallic cylinder or cup.

Instead of generating electricity, only mechanical energy can be made available. The energy extracted from the system can turn a saw, a grinder, a frictional system for generating heat, move an object, and so forth.

Instead of being secured only to the shaft, the distal ends of the turbine blades can be secured together by attachment to a cylinder which is coaxial with the pipe, resulting in a strengthening of the turbine.

While the present system employs elements which are well known to those skilled in the art of magnetic couplings, it combines these elements in a novel way which produces a new result not heretofore discovered.

Accordingly the scope of this invention should be determined, not by the embodiments illustrated, but by the appended claims and their legal equivalents.

The invention claimed is:

1. A system for extracting energy from fluid flowing in a conduit, comprising:
    (a) a conduit for carrying a flowing fluid therethrough, said conduit having a predetermined external diameter,
    (b) a turbine comprising a plurality of magnetically permeable radial blades rotatably mounted in said conduit upon an axis or pivot that is parallel to said conduit, such that fluid flowing in said conduit will cause said blades to rotate,
    (c) a ring concentric to and positioned around said conduit, said ring having an inside and an outside and an internal diameter larger than said external diameter of said conduit, said ring being rotatably mounted so as to be able to rotate with respect to said conduit,
    (d) a corresponding plurality of magnetically permeable members mounted on said inside of said ring, said plurality of magnetically permeable members being spaced around said ring so that they can be radially aligned with said respective plurality of blades, by adjusting the rotational position of said conduit,
    (e) one of said plurality of said magnetically permeable members or said plurality of magnetically permeable radial blades being magnetized, and
    (f) a coupling for mechanically coupling rotation of said ring to a mechanical utilization device.

2. The system for extracting energy of claim 1 wherein one of said plurality of said magnetically permeable members or said plurality of magnetically permeable radial blades is permanently magnetized.

3. The system for extracting energy of claim 1 wherein one of said plurality of magnetically permeable members or said plurality of magnetically permeable radial blades is electrically magnetized.

4. The system for extracting energy of claim 1, further including said mechanical utilization device, said mechanical utilization device being an electrical generator.

5. The system for extracting energy of claim 1 wherein said ring is made of a magnetically permeable material.

6. The system for extracting energy of claim 1 wherein said ring and said conduit are circular and said conduit is fixed.

7. A system for generating electricity from a fluid flowing in a conduit, comprising:
    a. a conduit for carrying a flowing fluid, said conduit having an inside surface and an outside surface,
    b. a turbine comprising a plurality of magnetically permeable radial blades rotatably mounted in said conduit upon an axis or pivot that is parallel to said conduit, such that fluid flowing in said conduit will cause said blades to rotate,
    c. a ring having an inside surface and an outside surface, said inside surface being concentric to, positioned around, and spaced from said outside surface of said conduit, said ring being magnetically permeable and rotatable with respect to said conduit,
    d. a corresponding plurality of magnetically permeable pole pieces mounted on said inside surface of said ring and spaced ring so that they can be radially aligned with said respective plurality of blades, by adjusting the rotational position of said conduit,
    e. at least one of said plurality of magnetically permeable pole pieces or said plurality of magnetically permeable radial blades being magnetized, and
    f. means for coupling rotation of said ring to a mechanical utilization device.

8. The system for generating electricity of claim 7 wherein said mechanical utilization device is a generator for converting rotational mechanical energy to electrical energy.

9. The system for extracting energy of claim 7 wherein one of said plurality of said pole pieces or said plurality of magnetically permeable radial blades is permanently magnetized.

10. The system for extracting energy of claim 7 wherein one of said plurality of pole pieces or said plurality of magnetically permeable radial blades is electrically magnetized.

11. The system for extracting energy of claim 7 wherein said ring and said conduit are circular and said conduit is fixed.

12. A method of generating electricity from a fluid flowing in a conduit, comprising:
    a. providing a conduit for carrying a flowing fluid, said conduit having an inside surface and an outside surface,
    b. providing a turbine comprising a plurality of magnetically permeable radial blades and rotatably mounting said turbine in said conduit upon an axis or pivot that is parallel to said conduit, such that fluid flowing in said conduit will cause said blades to rotate,
    c. providing a ring having an inside surface and an outside surface, said inside surface being concentric to, positioned around, and spaced from said outside surface of said conduit, said ring being magnetically permeable and rotatable with respect to said conduit,
    d. providing a corresponding plurality of magnetically permeable pole pieces mounted on said inside surface of said ring and spaced ring so that they can be radially aligned with said respective plurality of blades, by adjusting the rotational position of said conduit,
    e. magnetizing at least one of said plurality of magnetically permeable pole pieces or said plurality of magnetically permeable radial blades, and
    f. forcing a fluid to flow through said conduit to cause said blades to rotate and thereby cause said ring to rotate, and
    g. coupling rotation of said ring to a mechanical utilization device.

13. The method of generating electricity of claim 12 wherein said mechanical utilization device is a generator for converting rotational mechanical energy to electrical energy.

14. The method of extracting energy of claim 12 wherein one of said plurality of said pole pieces or said plurality of magnetically permeable radial blades is permanently magnetized.

15. The method of extracting energy of claim 12 wherein one of said plurality of said pole pieces or said plurality of magnetically permeable radial blades is electrically magnetized.

16. The method of extracting energy of claim 12 wherein said ring and said conduit are circular and said conduit is fixed.

* * * * *